Figure 1:
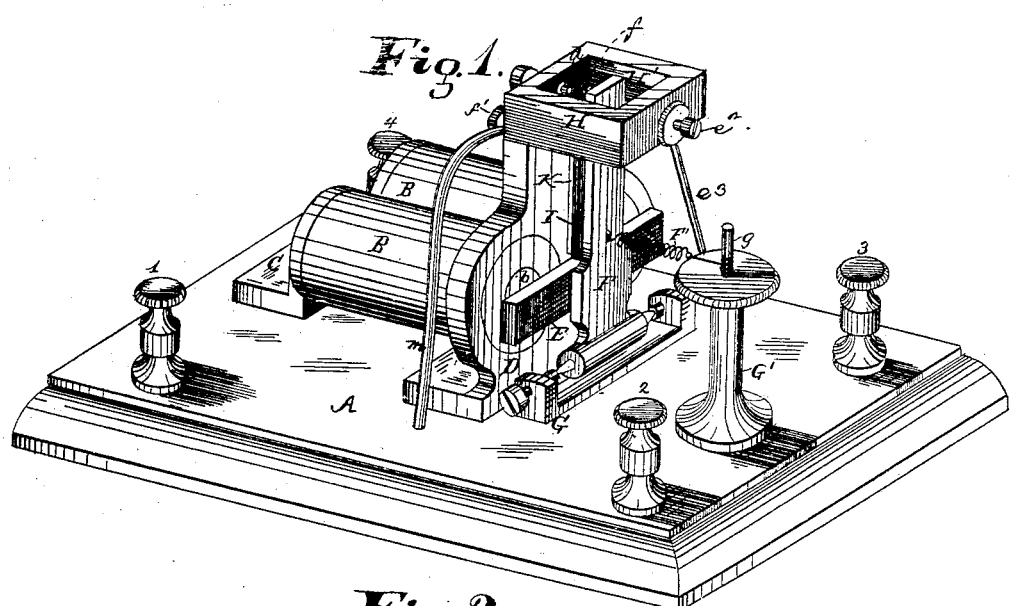

(No Model.) 2 Sheets—Sheet 1.

A. A. CONNOLLY.
PROTECTOR FOR TELEPHONIC AND TELEGRAPHIC INSTRUMENTS.

No. 291,299. Patented Jan. 1, 1884.

Witnesses
Jos. B. Connolly
A. C. Huntemann

Inventors
A. A. Connolly
By Connolly Bros
Attorneys

N. PETERS, Photo-Lithographer, Washington, D. C.

UNITED STATES PATENT OFFICE.

ANTHONY A. CONNOLLY, OF WASHINGTON, DISTRICT OF COLUMBIA.

PROTECTOR FOR TELEPHONIC AND TELEGRAPHIC INSTRUMENTS.

SPECIFICATION forming part of Letters Patent No. 291,299, dated January 1, 1884.

Application filed April 3, 1883. (No model.)

*To all whom it may concern:*

Be it known that I, ANTHONY A. CONNOLLY, of Washington, in the District of Columbia, have invented certain new and useful Improvements in Protectors for Telephonic and Telegraphic Instruments; and I do hereby declare that the following is a full, clear, and exact description of the invention, which will enable others skilled in the art to which it appertains to make and use the same, reference being had to the acompanying drawings, which form a part of this specification.

Where conductors of electricity of widely different potentiality or quantity are placed in the vicinity of or travel near one another there is always a degree of danger to the instruments which are connected with and form a part of the circuit of the conductor carrying the lesser current, by reason of an accidental crossing or contact of such conductors, as by such contact the more powerful current is apt to, and in most cases will, be conveyed off by the conductor carrying the lesser, and inflict serious injury upon or entirely destroy the coils and contact-points of the instruments connected therewith.

The present invention relates to a device for diverting an abnormal current from any instrument to which it may be attached and providing an outlet or ground for such abnormal current, whereby all danger of injury to the protected instrument is avoided.

My invention has for its object the provision of means whereby an electric instrument will be protected from the injurious effects of an abnormal current of electricity coming through either its incoming or outgoing line, and such abnormal current will be diverted and sent to ground.

My invention consists in the provision of an electro-magnet of low resistance, provided with an armature and retracting-spring and certain contact-points having electrical connection with the instrument to be protected, and with the incoming and outgoing lines thereof and a ground-connection, the arrangement of parts being such that a normal current of electricity coming through either of said lines will pass through the coils of said magnet without energizing the same, while an abnormal current will energize the magnet of the protecting-instrument, cause its armature to be attracted, and thereby divert itself to ground, such diversion continuing as long as the abnormal current flows, the circuit through the instrument to be protected being automatically restored upon cessation of the same.

Figure 2:
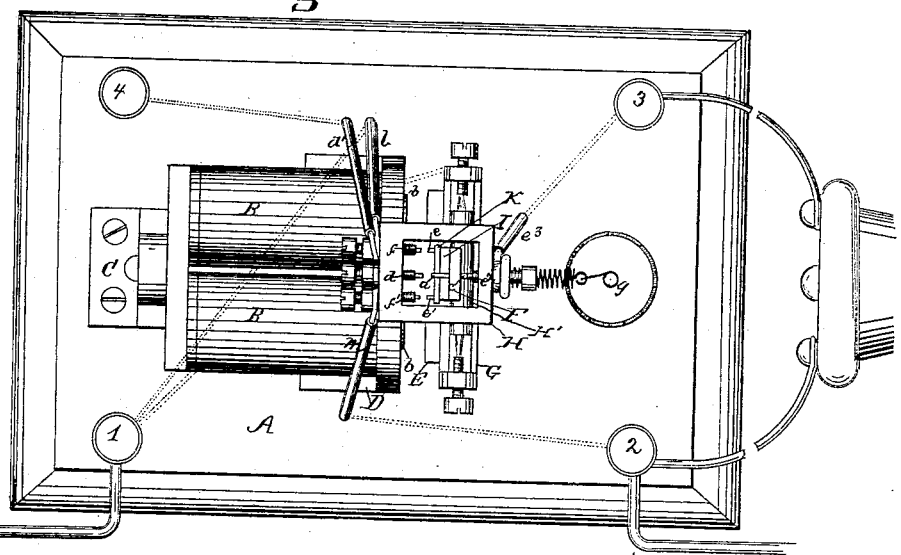
Figure 3:
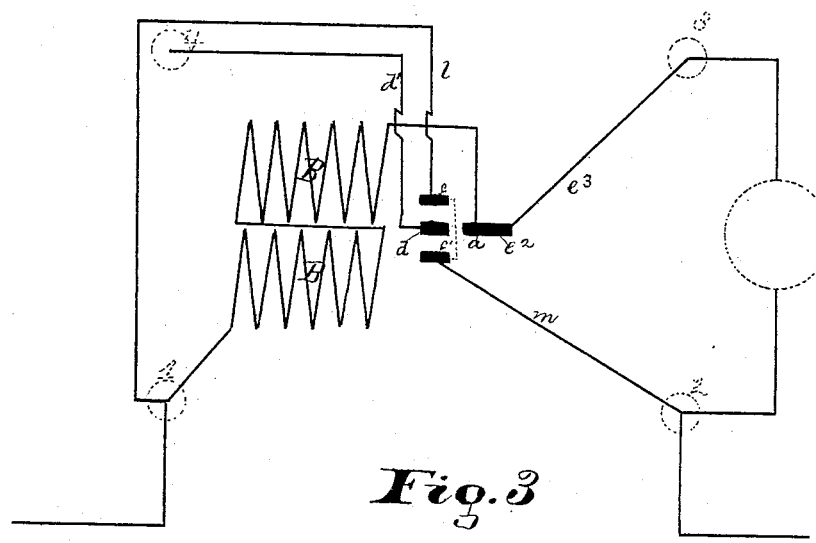

Referring to the accompanying drawings, Figure 1 is a perspective view of the protecting-instrument; Fig. 2, a plan or top view of the same, and Fig. 3 a diagram showing the circuits.

A is the base of the protector, provided with the several binding-points 1 2 3 4.

B B represent the coils of the magnet, and $b\ b$ the cores of the same. This magnet is of low resistance, being wound with coarse wire, and is supported at its rear end by a bracket, C, and at its forward end by an upright frame D.

E is the armature, secured to a lever, F, which has pivotal bearings in a frame, G, secured to base A.

To the back of lever F is attached a retracting-spring, F', which is secured at its outer end to an adjusting-pin, $g$, on a post, G'.

Upon the top of the frame D is secured a block of non-conducting material, H, having a central opening, H', through which the upper end of lever F projects. The lever F has a front stop or contact-point, $a$, and a back stop, $c$, and the block H is provided at front and rear with similar stops, $d$ and $e^2$, respectively.

To the front of lever F is secured a piece of non-conducting material, I, and to the piece I is attached a spring-tongue, K, whose upper end projects into the opening in block H, and is provided with contact-points $e$ and $e'$, which register with, and when the armature is attracted by the magnet come in contact with, similar contact-points, $f$ and $f'$, in the back of the opening of the block H, the point $f$ being connected by a wire, $l$, with the binding-post 1, and the point $f'$ being connected with binding-post 2 by a wire, $m$. The incoming line is connected with post 1, the outgoing line with post 2, the circuit of the instrument to be protected is from post 2 to post 3, and the ground-connection is made with post 4.

The operation of my invention is as follows: A normal current entering the protecting-instrument at post 1 passes from thence to the coils B B, but without energizing the magnets, from the coils B to the frame G, to lever F, to stop $c$, to stop $e$, and from thence by a wire, $e^3$, to the post 3, through the instrument to be protected to post 2, and out through the line. An abnormal current entering at the same point will pass through the coils B B, as before, but will energize the magnet and cause the armature to be drawn forward, breaking contact at $c-e^2$ and making contact at $a-d$, and proceeding to the ground-post 4 by a wire, $d'$, connecting stop $d$ with said post. It will be seen that when an abnormal current enters the apparatus at post 1 it causes the circuit through the instrument to be protected to be cut out, thus preventing the coils of said instrument from being burned. If an abnormal current enters the apparatus from the other side—i.e., through post 2—it will momentarily pass through the instrument to be protected to post 3, to stop $e^2$ by wire $e^3$, through lever F to the magnet, and out through post 1; but at the moment of its passage through the coils of the magnet the latter is energized and its armature attracted, breaking the circuit through the instrument to be protected before any damage can ensue, and establishing a circuit to ground, as follows: from post 2 by wire $m$ to contact $f'-e'$, across the tongue K to contact $e-f$, and from $f$ by wire $l$ to binding-post 1, from post 1 through the coils B B and lever F to contact $a-d$, and thence to ground at post 4.

The advantages of the construction and arrangement shown are, that an instrument may be protected from both sides by a single magnet and armature and the original circuit restored automatically as soon as the abnormal current ceases.

What I claim as my invention is—

1. A protector of electrical instruments from abnormal currents, comprising an electro-magnet adjusted to respond only to abnormal currents, a normally-open earth-circuit, and suitable contacts and connections, whereby an abnormal current crossing either the incoming or outgoing line of the protected instrument will pass through said magnet and direct the current to ground, the abnormal current from either direction being made to follow the same path through the magnet to ground, substantially as described.

2. A protector for electrical instruments, comprising an electro-magnet adapted to respond to only abnormal currents, a normally-open earth-circuit, and suitable contacts and connections, whereby an abnormal current crossing the outgoing line will energize the magnet, and by the movement of its armature be provided with a circuit to the incoming line and thence through the magnet to ground, the instrument to be protected being by the movement of said armature cut out of the circuit, substantially as described.

3. In an electro-magnetic device for the protection of electrical instruments from abnormal currents, the combination, with an electro-magnet and its armature for short-circuiting or diverting the abnormal currents to earth, and a normally-open earth-circuit, of contact-points on either side of said armature, and diverted circuits leading therefrom, substantially as described, whereby an abnormal current crossing the main line on either side of the protected instrument will pass through the coils of the magnet in the one and same direction and reach earth by the one path.

4. In an instrument for protecting electrical apparatus from abnormal currents, the combination, with an electro-magnet adapted to respond to only such abnormal currents, and wound in single continuous helical form, of a conducting-armature, a normally-open earth-circuit and back stop normally in circuit with the protected instrument, and suitable contacts and shunt or diverted circuits, substantially as described, whereby an abnormal current crossing the main line on either side of the protected instrument will be caused to energize said magnet, and through the same effect a diversion, short circuit, or shunt to earth.

5. In an automatic electrical protecting-switch, the combination, with the electro magnet or magnets B, conducting-armature F, and back stop, $e^2$, arranged and adapted to be in normal circuit with the main line, of the diverted line circuits or shunts $l$ $m$, short earth-circuit $d'$, and contacts $d$ $f$ $f'$, substantially as and for the purpose described.

In testimony that I claim the foregoing as my own I have hereto affixed my signature in presence of two witnesses.

ANTHONY A. CONNOLLY.

Witnesses:
  THOS. A. CONNOLLY,
  JOS. B. CONNOLLY.